(12) United States Patent
Christensen et al.

(10) Patent No.: US 8,313,864 B2
(45) Date of Patent: Nov. 20, 2012

(54) LI-ION BATTERY WITH BLENDED ELECTRODE

(75) Inventors: John F. Christensen, Mountain View, CA (US); Boris Kozinsky, Newton, MA (US); Jasim Ahmed, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 12/437,592

(22) Filed: May 8, 2009

(65) Prior Publication Data
US 2010/0285363 A1     Nov. 11, 2010

(51) Int. Cl.
H01M 4/58     (2010.01)
(52) U.S. Cl. .................................. 429/231.95
(58) Field of Classification Search ............. 429/231.95
See application file for complete search history.

(56) References Cited

U.S. PATENT DOCUMENTS

| | | | |
|---|---|---|---|
| 6,046,575 A | 4/2000 | Demuro | |
| 6,524,738 B1 * | 2/2003 | Lee et al. | 429/59 |
| 6,759,168 B2 * | 7/2004 | Yamasaki et al. | 429/231.5 |
| 6,773,616 B1 | 8/2004 | Chen et al. | |
| 7,029,796 B2 | 4/2006 | Choi et al. | |
| 7,303,837 B2 * | 12/2007 | Jung et al. | 429/217 |
| 8,021,780 B2 * | 9/2011 | Rigobert et al. | 429/178 |
| 2004/0214091 A1 | 10/2004 | Lim et al. | |
| 2004/0242804 A1 | 12/2004 | Medsker et al. | |
| 2005/0064282 A1 | 3/2005 | Inagaki et al. | |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2007/0292764 A1 | 12/2007 | Soma et al. | |
| 2008/0044732 A1 | 2/2008 | Salot et al. | |
| 2008/0058194 A1 | 3/2008 | Grader et al. | |

FOREIGN PATENT DOCUMENTS

| | | |
|---|---|---|
| EP | 1050914 | 11/2000 |
| EP | 1143547 | 10/2001 |
| WO | 9701191 | 1/1997 |
| WO | 2008002626 | 1/2008 |

OTHER PUBLICATIONS

International Search Report in corresponding PCT application (i.e., PCT/US2010/034051), mailed Jun. 25, 2010 (3 pages).
Gnanamuthu et al., "Electrochemical properties of Super P carbon black as an anode active material for lithium-ion batteries", Materials Chemistry and Physics, 2011, pp. 831-834, vol. 130, Elsevier, South Korea (4 pages).
Christensen, J. and J. Newman, Effect of anode film resistance on the charge/discharge capacity of a lithium-ion battery. Journal of the Electrochemical Society, 2003. 150(11): p. A1416-A1420.
Christensen, J. and J. Newman, Cyclable Lithium and Capacity Loss in Li-Ion Cells. Journal of the Electrochemical Society, 2005. 152(4): p. A818-A829.
Amatucci, G.G. and N. Pereira, Flouride based electrode materials for advanced energy storage devices. Journal of Flourine Chemistry, 2007 128(4):p. 243-262.
Mikhaylik, Y. Fundamental Chemistry of Sion Power Li/S Battery, in International Battery Association and Hawaii Battery Conference. 2006. Waikoloa, HI.
Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.
Shim, J., K.A. Striebel, and E.J. Cairns, the Lithium/Sulfur Rechargeable Cell. Journal of the Electrochemical Society, 2002. 149: p. A1321.
Doughty, D.H., D.L. Coleman, and M.J. Berry. Abuse Tolerance Studies on Lithium-Sulfur (Li-S) Rechargeable Batteries. in 43rd Power Sources Conference. 2008. Philadelphia, PA.

* cited by examiner

*Primary Examiner* — Stuart Hendrickson
(74) *Attorney, Agent, or Firm* — Maginot, Moore & Beck

(57) ABSTRACT

An electrochemical cell with a blended cathode in one embodiment includes a negative electrode including a form of lithium, a positive electrode spaced apart from the negative electrode, a separator positioned between the negative electrode and the positive electrode, a first active material in the positive electrode including a form of lithium, and a second active material in the positive electrode including a form of sulfur.

6 Claims, 2 Drawing Sheets

LI-ION BATTERY WITH BLENDED ELECTRODE

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by Boris Kozinsky et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/437,873 entitled "Li-ion Battery with Porous Anode Support" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

Li/S batteries also have limitations. By way of example, the United States Advanced Battery Consortium has established a goal of >1000 cycles for batteries used in powering an electric vehicle. Li/S batteries, however, exhibit relatively high capacity fade, thereby limiting the useful lifespan of Li/S batteries.

One mechanism which may contribute to capacity fade of Li/S batteries is the manner in which the sulfur reacts with lithium. In general, sulfur reacts with lithium ions during battery discharge to form polysulfides ($Li_xS$), which may be soluble in the electrolyte. These polysulfides react further with lithium (i.e., the value of x increases from ¼ to ⅓ to ½ to 1) until $Li_2S_2$ is formed, which reacts rapidly to form $Li_2S$. In Li/S batteries described in the literature, both $Li_2S_2$ and $Li_2S$ are generally insoluble in the electrolyte. Hence, in a system in which intermediate polysulfides are soluble, each complete cycle consists of soluble-solid phase changes, which may impact the integrity of the composite electrode structure.

Specifically, $Li_2S$ may deposit preferentially near the separator when the current through the depth of the positive electrode is non-uniform. Non-uniformity is particularly problematic at high discharge rates. Any such preferential deposition can block pores of the electrode, putting stress on the electronically conducting matrix and/or isolating an area from the composite electrode. All of these processes may lead to capacity fade or impedance rise in the battery.

Moreover, soluble polysulfides are mobile in the electrolyte and, depending on the type of separator that is used, may diffuse to the negative electrode where the soluble polysulfides may becoming more lithiated through reactions with the lithium electrode. The lithiated polysulfide may then diffuse back through the separator to the positive electrode where some of the lithium is passed to less lithiated polysulfides. This overall shuttle process of lithium from the negative electrode to the positive electrode by polysulfides is a mechanism of self discharge which reduces the cycling efficiency of the battery and which may lead to permanent capacity loss.

Some attempts to mitigate capacity fade of Li/S batteries rely upon immobilization of the sulfur in the positive electrode via a polymer encapsulation or the use of a high-molecular weight solvent system in which polysulfides do not dissolve. In these batteries, the phase change and self-discharge characteristics inherent in the above-described Li/S system are eliminated. These systems have a higher demonstrated cycle life at the expense of high rate capability and capacity utilization.

What is needed therefore is a battery that exhibits the high energy density of a Li/S cathode while providing high rate capability and capacity utilization. A further need exists for a battery that exhibits reduced capacity fade due to internal discharge.

SUMMARY

In accordance with one embodiment, an electrochemical cell with a blended cathode includes a negative electrode including a form of lithium, a positive electrode spaced apart from the negative electrode, a separator positioned between the negative electrode and the positive electrode, a first active material in the positive electrode including a form of lithium, and a second active material in the positive electrode including a form of sulfur.

In accordance with another embodiment, an electrochemical cell includes a negative electrode, a positive electrode spaced apart from the negative electrode, a separator positioned between the negative electrode and the positive electrode, a first active material in the positive electrode including a form of sulfur, and a second active material in the positive electrode that does not include a form of sulfur.

DESCRIPTION

Figure 1:
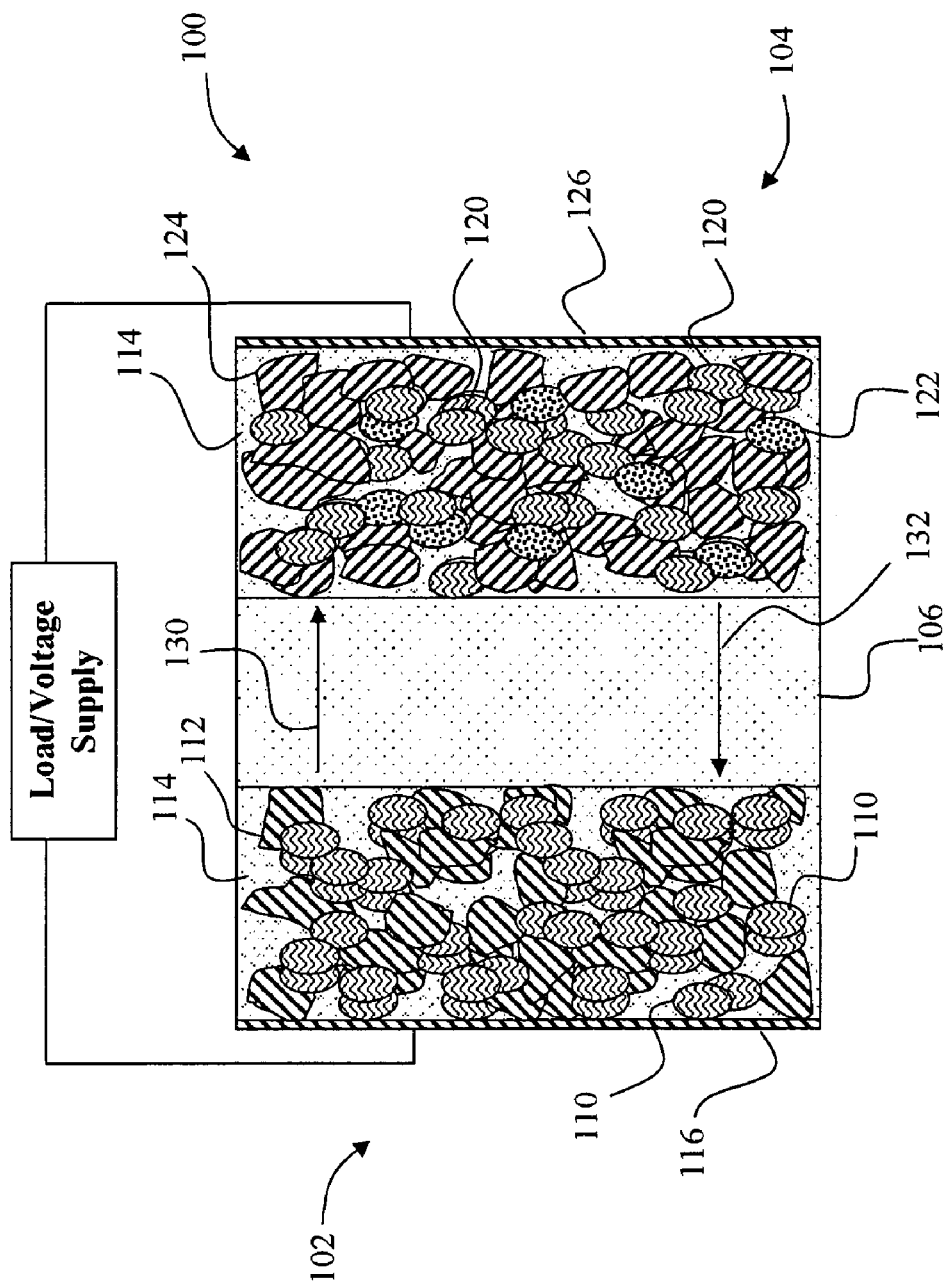
FIG. 1 depicts a schematic of a battery system including an electrochemical cell with one electrode including a form of lithium and another electrode including an active material with a form of lithium and another active material with a form of sulfur.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. The negative electrode 102 includes active materials 110 into which lithium can be inserted, inert materials 112, electrolyte 114 and a current collector 116.

The negative electrode 102 may be provided in various alternative forms. The negative electrode 102 may incorporate dense Li metal or a conventional porous composite electrode (e.g., graphite particles mixed with binder). Incorporation of Li metal is desired since the Li metal affords a higher specific energy than graphite.

The positive electrode 104 includes active materials 120 and 122 into which lithium can be inserted, inert materials 124, the electrolyte 114 and a current collector 126. The separator region 106 includes an electrolyte with a lithium cation and serves as a physical and electrical barrier between the negative electrode 102 and the positive electrode 104 so that the electrodes are not electronically connected within the cell 100. The active material 120 includes a form of sulfur and may be entirely sulfur. The active material 122 does not incorporate sulfur and preferably incorporates a form of lithium such as lithium titanium oxide, or $Li_{4+x}Ti_5O_{12}$. The active materials 120 and 122 are preferably selected to be materials which react with lithium in similar voltage windows. While the active materials 120 and 122 are depicted in a similar fashion in FIG. 1, the sulfur chemistry may react in a substantially different manner. For example, sulfur tends to dissolve into the electrolyte as it becomes lithiated. The sulfur then becomes more lithiated and then re-precipitates on the carbon surface.

Under moderate power demands, the lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 130 of FIG. 1.

In the ideal discharging of the cell 100, the electrons are generated at the negative electrode 102 because there is extraction via oxidation of lithium ions from the active material 110 of the negative electrode 102, and the electrons are consumed at the positive electrode 104 because there is reduction of lithium ions predominantly into the active material 122 of the positive electrode 104. Oxidation of lithium ions occurs predominantly in the active material 122 because the active material 122 is a material that reacts with and/or incorporates lithium into its structure more rapidly than the first active material 120. During discharging, the reactions are reversed, with lithium and electrons moving in the direction of the arrow 132.

In various applications, however, the cell 100 may be subjected to sudden increases in power demand. When used in vehicles, for example, acceleration of the vehicle places an increased demand on the cell 100. As the demand exceeds the rate of Li reduction supported by the active material 120, the reduction of lithium ions into the active material 122 of the positive electrode 104 increases.

Accordingly, for moderate power demand, power is provided primarily through reactions including the active material 122 which does not implicate the same mechanisms of capacity fade implicated by the active material 120. Cycling of the active material 120 is thus reduced, thereby minimizing the deleterious effects of rapid lithiation of the sulfur. The balance of active material 120 and active material 122 may thus be adjusted to provide the surge capability desired for a particular application while maximizing the life of the cell 100.

Another active material may also be incorporated into a sulfur cathode to simplify state-of-charge determination. $Li_xS_8$ has a characteristic plateau over a particular SOC range (x>4), and it is difficult to ascertain the SOC of the material from the voltage. By combining $Li_xS_8$ with a material that has a sloping potential in the same potential window, SOC determination for the cell based upon the cell voltage is simplified. Lithium titanate, however, has a flat potential and would not provide simplified SOC determination.

While one form of a negative electrode 102 and a positive electrode 104 is depicted in FIG. 1, a blended electrode 104 may be provided in variety of alternative embodiments. Such embodiments may include a dense Li negative electrode or a porous composite negative electrode. The blended positive electrode 104 may likewise be a dense electrode or a porous electrode The manner in which a particular negative electrode 102/positive electrode 104 is manufactured can vary based upon the particular form selected for the negative electrode 102 and positive electrode 104. Lithium titanate, for example, is a ceramic material. Accordingly, the lithium titanate can be integrated as a compact (i.e., nonporous) layer. As a compact layer, however, winding of the cell layers for a wound cell type battery may present challenges. Alternatively, the positive electrode 104 may consist of a porous composite (just as in a conventional electrode) that consists of small lithium titanate and sulfur particles and binder (e.g., polyvinyl difluoride). The pores in this embodiment may be filled with a Li-cation containing electrolyte (just as in any porous electrode).

A porous lithium titanate layer, however, typically requires a substrate in order to be handled. For example, conventional porous electrodes are deposited as slurries on a current collector, the solvent of the slurry is removed (leaving pores in place of the solvent), and the composite electrode is "calendared" (compressed with a roll press) to achieve the desired thickness and porosity and to improve particle-to-particle contact. Usually the electrodes are double sided (i.e., with porous electrodes on either side of the current collector).

A porous-composite negative electrode/ porous-composite lithium titanate/LiS electrode may be obtained by forming the electrode in a conventional manner followed by a further deposition of slurry including the lithium titanate and LiS. Subsequently, the solvent in the lithium titanate/LiS slurry may be evaporated and the formed layers calendared.

Figure 2:
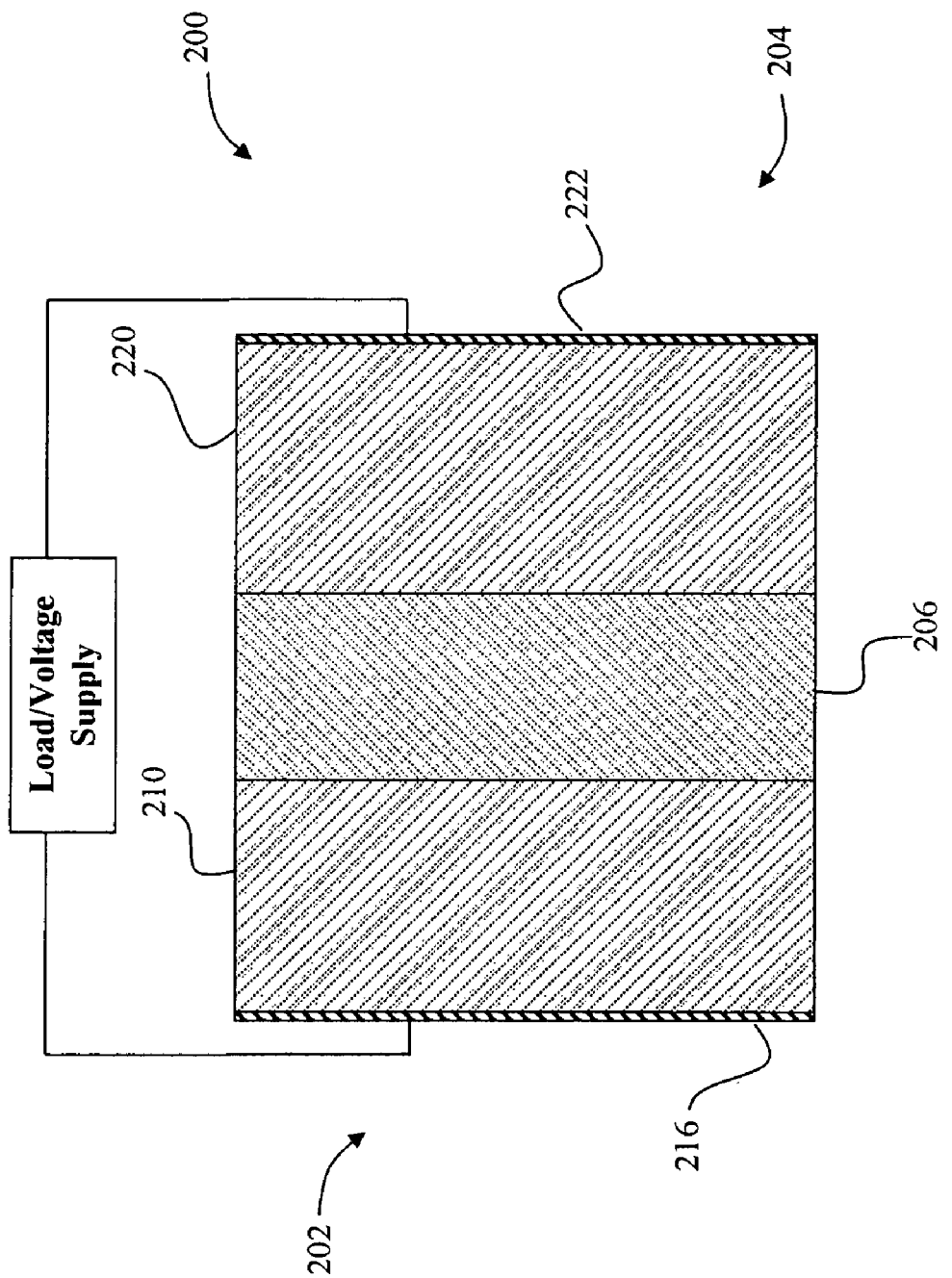
FIG. 2 depicts a schematic of a battery system including an electrochemical cell with one electrode including a form of lithium and a fully dense electrode including an active material with a form of lithium along with active material with a form of sulfur.

FIG. 2 depicts an alternative embodiment of a lithium-ion cell 200 which operates in substantially the same manner as the lithium-ion cell 100. The lithium-ion cell 200, however, is a solid state cell which includes a negative electrode 202, a positive electrode 204, and an electrolyte layer 206 between the negative electrode 202 and the positive electrode 204. The negative electrode 202 includes an active layer 210 including inert materials and active materials into which lithium can be inserted, and a current collector 216.

The positive electrode 204 includes an active layer 220 including inert materials and active materials into which lithium can be inserted, and a current collector 222. The electrolyte layer 206 supplies lithium cation and serves as an electrical barrier between the negative electrode 202 and the positive electrode 204 so that the electrodes are not electronically connected within the cell 200. The active material used in the active layer 220 includes a form of sulfur and may be entirely sulfur. Another active material within the active layer 220 does not incorporate sulfur and preferably incorporates a form of lithium such as lithium titanium oxide, or $Li_{4+x}Ti_5O_{12}$.

In a further embodiment, one of the anode and the cathode may be solid while the other of the anode and the cathode is porous. By way of example, the lithium-ion cell 200 may be modified to replace the solid positive electrode 204 with the porous positive electrode 104 of FIG. 1.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
   a negative electrode including a form of lithium;
   a positive electrode spaced apart from the negative electrode;
   a separator positioned between the negative electrode and the positive electrode;
   a first active material into which lithium can be reversibly inserted, the first active material located in the positive electrode and including a form of lithium but not including sulfur; and
   a second active material in the positive electrode including a form of sulfur.

2. The electrochemical cell of claim 1, wherein the second active material includes $Li_xS_8$, and $0 \leq x \leq 16$.

3. The electrochemical cell of claim 2, wherein the first active material includes lithium oxide.

4. The electrochemical cell of claim 2, wherein the first active material includes lithium titanium oxide.

5. The electrochemical cell of claim 1, wherein the first active material includes lithium oxide.

6. The electrochemical cell of claim 1, wherein the first active material includes lithium titanium oxide.

* * * * *